United States Patent [19]

Valint et al.

[11] Patent Number: 4,835,234

[45] Date of Patent: May 30, 1989

[54] HYDROPHOBICALLY FUNCTIONALIZED CATIONIC POLYMERS

[75] Inventors: Paul L. Valint, Asbury; Jan Bock, Bridgewater; Donald F. Jacques, Belle Mead, all of N.J.

[73] Assignee: Exxon Research and Engineering Company, Florham Park, N.J.

[21] Appl. No.: 54,382

[22] Filed: May 26, 1987

Related U.S. Application Data

[63] Continuation of Ser. No. 904,548, Sep. 8, 1986.

[51] Int. Cl.$^4$ .................. C08L 27/10; C08F 20/60; C08F 20/52; C08F 20/58

[52] U.S. Cl. .......................... 526/258; 526/287; 526/292.5; 526/295; 526/304; 526/307; 526/307.2; 526/310

[58] Field of Search ............... 526/310, 304, 307, 310, 526/307.2, 258, 287, 292.5, 295

[56] References Cited

U.S. PATENT DOCUMENTS

| | | | |
|---|---|---|---|
| 4,138,539 | 2/1979 | Fandolt et al. | 526/93 |
| 4,154,910 | 5/1979 | Tanaka et al. | 526/307.2 |
| 4,395,524 | 7/1983 | Emmons et al. | 526/307.2 |
| 4,452,957 | 6/1984 | Neigel | 526/310 |
| 4,514,551 | 4/1985 | Furuno et al. | 526/233 |
| 4,520,182 | 5/1985 | Turner et al. | 526/307.2 |
| 4,533,708 | 8/1985 | Castello | 526/295 |

Primary Examiner—Joseph L. Schofer
Assistant Examiner—Peter F. Kulkosky
Attorney, Agent, or Firm—Richard E. Nanfeldt

[57] ABSTRACT

Novel hydrophobically associating terpolymer compositions containing cationic functionality are described. These water soluble or water dispersible polymers contain both water soluble and water insoluble monomers. The water soluble monomers are ethylenically unsaturated nonionic monomers, such as acrylamide (AM), and cationic monomers, such as a salt of an amine base (C), such as 3-methacrylamidopropyltrimethylammonium chloride (MAPTAC), 2-methacrylatoethyltrimethylammonium chloride (METAC) and diallyldimethylammonium chloride (DMDAAC). The hydrophobic or water insoluble monomer is a higher alkyl(meth)acrylamide or alkyl (meth)acrylate (R). These polymers are referred to as CRAM. While the novel compositions of this invention impart unusual properties to water based fluids, they are extremely efficient for clean-up of waste waters containing organic contaminants and for breaking oil-in-water emulsions.

16 Claims, No Drawings

HYDROPHOBICALLY FUNCTIONALIZED CATIONIC POLYMERS

This application is a continuation of Ser. No. 904,548, filed 9/8/86.

BACKGROUND OF THE INVENTION

1. Field of the Invention

The present invention provides novel hydrophobically associating terpolymer compositions containing cationic functionality. These water soluble or water dispersible polymers contain both water soluble and water insoluble monomers. The water soluble monomers are ethylenically unsaturated nonionic monomers, such as acrylamide (AM), and a salt of an ethylenically unsaturated amine base (C), such s 3-methacrylamidepropyltrimethylammonium chloride (MAPTAC), 2-methacrylatoethyltrimethylammoniuim chloride (METAC) and diallyl dimethylammonium chloride (DMDAAC). The hydrophobic or water insoluble monomer is a higher alkyl(meth)acrylamide or alkyl(meth)acrylate (R). These polymers are hereinafter referred to as CRAM. While the novel compositions of this invention impart unusal properties to water based fluids, they are extremely efficient for clean-up of waste waters containing organic contaminants and for breaking oil-in-water emulsions.

2. Description of the Prior Art

The production of waste water clean enough for safe disposal continues to be a problem, especially when oil is emulsified in the primary waste water. In oil production, especially where high levels of water flooding or steam flooding are being practiced, oil-in-water emulsions are generated. These water continuous emulsions are generally referred to as reverse emulsions since the more usual oil field produced fluid is a water-in-oil emulsion. Reverse emulsions are difficult to break and generally result in large volumes of oil contaminated waste water that must be treated for removal of oil and solids before disposal by either release to surface streams, injection or use as boiler water make-up for steam generation. Other oil-in-water emulsions of concern in the waste water treating area are those produced as a result of steel mill and metal working operations, food processing, refinery and chemical plant operation, cooling water blow-down, bitumen extration from tar sands and shale oil operations, rain water run-off and a host of others. These emulsions all have in common the fact that the oil or organic phase is insoluble in the water contnuous phase. The amount of oil dispersed in these water continuous emulsions varies from a few to several hundred parts per million in waste waters to several percent (5% to 25%) in fluids right out of the wellhead.

The oil is generally well dispersed in the water phase as very small droplets that are stabilized as a result of the presence of natural surfactants. The stability of these oil-in-water emulsions generally results from either a negative charge imparted to the droplets by these surfactants; from steric stabilization caused by surfactants; by the shear which the fluid experiences during production, which causes the generation of smaller and more stable droplets; or from several other sources. As the density of the organic phase becomes higher, approaching that of the water phase, further stability is imparted to the emulsion. The presence of fine solids, such as clays, sands, corrosion products, etc., in the fluids add to the stability of these oil-in-water emulsions. The stability of these oil-in-water emulsions must be overcome if the oil is to be removed from the water before disposal or in order to separate the oil from the water in the produced fluids in the case of oil production in water floods and steam floods.

Current practice is to attempt to break waste water oil-in-water emulsions using various mechanical techniques, such as API separators, induced air flotation (IAF), dissolved air flotation (DAF) or other methods. In the API separator method time is allowed for the oil droplets to come together and float to the surface or to settle to the bottom, if it is adsorbed on solids. In many cases just a large tank is used to provide a long holding time for a fluid under essentially low flow or quiescent conditions. The expectation is that the long residence time will permit coalescence and settling of the oil droplets. In the flotation methods air or another gas, such as natural gas or produced gases in the oil field where the waste water is generated, is used to form very small gas bubbles under the surface of the waste water which float to the surface. As the gas bubbles rise to the surface the oil droplets attach themselves and rise to the surface with them, concentrating at the surface where the oil can be removed.

Various chemicals, surfactants and polymers are generally applied to these waters to enhance the separation of oil and water using the above methods and, in some cases, are required if the method is to work at all. These chemicals are used to aid in foam generation in flotation. In addition, they may be used to cause oil droplet surface charge neutralization, which results in destabilization of the oil-in-water emulsion. This destabilization results in agglomeration of the oil droplets, floc formation, and possibly several other beneficial effects. While the use of such chemicals generally enhances the separation of oil from oil-in-water emulsions, there remains significant room for improvement.

Typically, treatment polymers are mixed into the waste water using various levels of shear. The water is then allowed to stand in a quiescent state for several hours or days until the oil flocculates and floats to the surface, where is it skimmed off. The water phase containing any residual oil is removed from beneath the surface and is either further treated, reused or is disposed of. As an alternative, to the above quiescent aging method, the polymer treated water can be sent to a gas flotation device for oil removal as described above.

Reverse emulsions produced at the wellhead in steam floods or water floods are generally treated with surfactants and polymers in a similar way. However, flotation equipment is not generally used on the wellhead fluid, but is used on the water, which we have called waste water, broken out of the produced emulsion. A more typical practice would be the use of settling tanks which hold the produced fluid in a quiescent state at elevated temperature for a period of time. This equipment may vary from a simple tank to devices which add heat and make use of electrical fields to accelerate the breaking of emulsions.

Improved methods for resolving oil-in-water emulsions, such as those produced at the wellhead, would find significant utility and environmental benefit. For example, if the level of residual oil remaining in the treated water could be reduced, or the speed of oil removal increased then a more economical treating operation would result. These improvements in treating method would provide both an economic and environmental benefit. The present invention describes an improved process for treating oil-in-water emulsions.

The type of water soluble polymers currently used are generally acrylamide copolymers or melamine/formaldehyde polymers or others. For example, Bolhofner in U.S. Pat. No. 4,472,284 describes the treatment of water containing fats, oils and greases using a melamine-formaldehyde condensation product, alone or in combination with a polyacrylamide. Rather high polymer concentrations are needed and a two polymer system can present handling difficulties during field operations.

Another approach to the treatment of waste water involves the use of water insoluble polymeric adsorbents as described by Renner in U.S. Pat. Nos. 3,716,483 or Takegani, et al. in 4,081,403. These processes for treating waste water are costly and cannot achieve the degree of clean-up of the present invention.

Another approach involves the use of copolymers of acrylamide with various cationic monomers of various comonomer ratios. Some of the cationic monomers that have been used are: methacrylamidoalkyltrimethylammonium salts, such as 3-methacrylamidopropyl trimethylammonium chloride (MAPTAC), as described in U.S. Pat. No. 4,160,742, or similar acrylate esters; diallyl dialkyl ammonium salts, as described by Booth and Linke in U.S. Pat. Nos. 3,147,218 and in 3,316,181; salts of dimethylaminoethylmethacrylate and the like. Buris, et al., U.S. Pat. No. 4,224,150, describe a process for clarifying aqueous systems employing quaternary ammonium adducts of polymerizable tertiary ammonium salts and acrylamide. These polymers are generally available as high molecular weight materials, either in aqueous solution, as emulsions of various types, or in solid form, which requires dissolution before use. The efficiency of resolving oily water or demulsifying oil-in-water emulsions, as well as the degree of final clean-up, are two areas where further improvement in treatment performance would be highly desirable. One of the objects of this invention is to decribe a class of novel terpolymers which provide this improvement.

The use of hydrophobic groups on water soluble polymers to enhance the rheological properties of water based fluids has been described. One approach to provide polyacrylamide based systems containing hydrophobic groups is described by Bock, et al., U.S. Pat. No. 4,520,182. Water soluble acrylamide copolymers containing a small amount of oil soluble or hydrophobic alkylacrylamide groups were found to impart efficient viscosification to aqueous fluids. Landoll, U.S. Pat. No. 4,304,902, describes copolymers of ethylene oxide with long chain epoxides which also required relatively large polymer concentration (approximately 1%) for thickening water and required surfactants for solubility due to irregularities in the polymerization. In a related case, U.S. Pat. No. 4,428,277, modified nonionic cellulose ether polymers are described. Although these polymers show enhanced viscosification relative to polymers not containing hydrophobic groups, the viscosification efficiency was very low, requiring 2 to 3 weight percent polymer to provide an enhancement. The use of surfactants to enable solubility and, in turn, viscosification, by a water soluble polymer containing hydrophobic groups is described by Evani, U.S. Pat. No. 4,432,881. The hydrophobic groups claimed are attached to the polymer via an acrylate linkage which is known to have poor hydrolytic stability. In addition, the need for a surfactant to achieve solubility and thickening efficiency should make such a system very salt sensitive, as well as very sensitive to small changes in surfactant and polymer concentrations. Emmons, et al., U.S. Pat. No. 4,395,524, teaches acrylamide copolymers as thickeners for aqueous systems. While these polymers possess hydrophobic groups they are prepared using alcohol containing solvent which are known chain transfer agents. The resulting polymers have rather low molecular weights and, thus, relatively high polymer concentrations are required to achieve reasonable viscosification of water based fluids. While these polymers containing hydrophobic groups are disclosed as providing aqueous thickening properties, their use for oil water clean-up or to break oil-in-water emulsions is not taught. Furthermore, the combination of hydrophobic groups and cationic groups in a water soluble polymer is not taught, nor the use of this combination for oily water treatment.

One of the objects of this invention is to overcome the deficiencies in the use of the water soluble polymers of the prior art for treating oily waste water and resolving oil-in-water emulsions. A new class of water soluble polymer will be described which can be used at a lower treat rate and, hence, is more efficient than prior art materials for oily water treatment. Furthermore, these novel terpolymers of the instant invention provide a superior degree of clean-up or oil removal in comparison to the prior art materials. These new polymers contain a nonionic water soluble monomer, such as acrylamide, a cationically charged water soluble ethylenically unsaturated amine based monomer, such as 3-methacrylamidopropyltrimethylammonium chloride (MAPTAC), and a water insoluble or hydrophobic monomer, such as an alkyl(meth)acrylamide or alkyl(meth)acrylate with a chain length of six carbons or greater.

When these polymers are placed in an aqueous solvent the hydrophobic groups aggregate or associate in a manner similar to a surfactant. This hydrophobic association between polymer chains in solution results in an increase in the hydrodynamic size of the molecule, which, in turn, causes an increase in viscosity. In addition, if oil droplets are present there is an attractive interaction between the hydrophobic groups and the hydrophobe oil droplets. We have found that the presence of cationic groups, such as 3-methacrylamidopropyltrimethylammoniuim chloride (MAPTAC) causes an expansion of the polymer in solution, an improvement in polymer solubility and a favorable interaction with the hydrophobic groups. Thus, polymers containing both cationic amine based groups and hydrophobic groups provide a significant improvement in viscosification efficiency of water based systems. The synergism between the cationic and hydrophobic groups in terms of oily water treatment or breaking of oil-in-water emulsions also sets these polymers apart from those of the prior art.

Synthesis of the hydrophobically associating polymers of the instant invention present difficulties. In order for polymerization to be effected the monomers must obviously come into close proximity to one another. The incompatibility of the oil soluble and water soluble monomers prevents an effective concentration of one or the other of these monomeric species from being achieved at the locus of polymerization of the other comonomer. Several processes described in the prior art could conceivably achieve this, but have serious deficiencies, necessitating the invention described more fully in copending application Attorney Docket No. C-1960. For example, simply dispersing the water insoluble monomer as fine particles in the aqueous medium containing dissolved water soluble monomers would result in low incorporation of the water insoluble monomer and would lead to a heterogeneous product of particles dispersed in a predominantly water soluble polymer. The resulting polymer could not be used to impart efficient and uniform thickening to water based fluids, nor be very effective in treating oily water.

Techniques for polymerizing the water soluble polymers, such as those taught in U.S. Pat. Nos. 4,154,190, 3,211,708, 3,002,960 and 3,284,393, cannot be used to prepare the compositions of this invention. Also, techniques or processes for preparing cationic polymers or copolymers containing cationic monomers, such as U.S. Pat. Nos. 4,452,957, 4,283,517, 4,160,742 and 3,316,181 have deficiencies in terms of incorporating the hydrophobic monomers needed for the polymers of this invention. This art does not teach the formation of a sufficiently fine dispersion of the water and oil soluble monomers to enable uniform reaction and homogeneous terpolymers to be produced. The use of mutual solvents or solvent mixtures to dissolve the water and oil soluble monomers as taught by Lenke, et al., U.S. Pat. No. 4,151,333, and Barua, et al., U.S. Pat. No. 4,098,987, has some serious limitations. Although this approach undoubtedly allows the incompatible monomers to come into close proximity to one another, since the dispersion is on a molecular scale, often the resulting copolymer is insoluble in the same solvent as shown in U.S. Pat. No. 4,151,333. This leads to precipitation of the copolymer before it has achieved sufficient molecular weight required in many applications, such as aqueous viscosification or oily water treatment. The use of water miscible solvents, such as alcohols, ether and actone, either along or with water, as taught in U.S. Pat. No. 4,098,987, results in low molecular weight (e.g., 10,000) polymers due to the high chain transfer characteristics of these solvents. By proper adjustment of the initiator levels and monomer concentrations water miscible solvents, either alone or in combination with water, could be used to prepare the hydrophobically functionalized cationic polymers of this invention. Thus, polymers produced by these teachings are effective viscosifiers for aqueous fluids and can be used for treating oily water. However, further improvements in polymer performance can be realized by using polymerization processes not containing chain transfer agents.

Two techniques have been found most useful for preparing hydrophobically associating copolymers of acrylamide and alkylacrylamide. The first method was based on the use of a water continuous microemulsion to disperse the oil soluble monomer in a solution of the water soluble monomers. Details of the procedures and techniques are taught by Turner, et al. in U.S. Pat. No. 4,521,580. A second method for preparing copolymers of acrylamide and alkylacrylamide was based on dispersing the oil soluble monomers using an aqueous micellar solution of the water soluble monomers. Suitable surfactants and the details of the polymerization are taught by Turner, et al. in U.S. Pat. No. 4,528,348. While either the microemulsion or micellar polymerization techniques can be used to prepare hydrophobically associating polymers containing a variety of water soluble nonionic monomers, a problem arises when the monomers have a strong interaction with the surfactants used in the polymerization. In particular, strong ionic interactions or complexes can be formed between cationic water soluble monomers, such as ethylenically unsaturated amine based monomers and anionic surfactants, such as alkyl sulfates and sulfonates. Thus, a new process is needed to overcome the limitations in these prior art processes. A copending application, Attorney Docket No. C-1960, teaches means of overcoming these deficiencies to enable preparation of the novel hydrophobically associating cationic polymer compositions of this invention.

SUMMARY OF THE INVENTION

The present invention describes novel hydrophobically associating terpolymer compositions containing cationic monomers useful for the clean-up of waste waters containing organic contaminants. In addition, they find utility ni processes for breaking or resolving oil-in-water emulsions, such as those produced during oil recovery operations. The polymers consist of acrylamide, a cationic monomer and alkyl(meth)acrylamide or alky(meth)acrylate. The cationic monomers used in these polymers are salts of an ethylenically unsaturated amine base, such as 3-methacrylamidopropyltrimethylammonium chloride (MAPTAC), 2-methacrylatoethyltrimethylammonium chloride (METAC) and diallyl dimethylammonium chloride (DMDAAC). The preparation of these polymer compositions is based on the complete solubilization of the water insoluble monomer by means of water miscible mutual solvents or preferably a dilute solution of a suitable water soluble surfactant. The resulting polymerization mixture, including the surfactants used for dispersing the water insoluble monomers, can be used for oily water treatment or the polymers can be isolated in the solid form for subsequent use.

DETAILED DESCRIPTION OF THE INVENTION

The present invention describes novel hydrophobically associating terpolymer compositions containing cationic monmers useful for the clean-up of waste waters containing organic contaminants. In addition, they find utility in processes for breaking or resolving oil-in-water emulsions, such as those produced during oil recovery operations. The polymer compositions of the instant invention consist of a nonionic water soluble monomer, such as acrylamide, a cationic water soluble monomer, and an oil soluble or hydrophobic monomer. The cationic monomers used in these polymers are salts of an ethylenically unsaturated amine base, such as 3-methacrylamidopropyltrimethylammonium chloride (MAPTAC), 2-methacrylatoethyltri methylammonihloride (METAC), and diallyl dimethylammoniuim chloride (DMDAAC). The oil soluble or hydrophobic monomers are an alkyl(meth)acrylamide or alkyl(meth)acrylate.

The water soluble hydrophobically associating terpolymers of the instant invention are characterized by the formula:

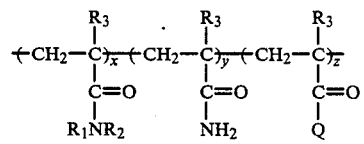

wherein $R_1$ is preferably a $C_4$ to $C_{30}$ linear or branched alkyl, alkylcycloalkyl, or alkylaryl group, more preferably $C_6$ to $C_{22}$, and most preferably $C_6$ to $C_{18}$; $R_2$ is the same or different group as $R_1$, or hydrogen or $C_1$ to $C_3$ linear or branched alkyl group; $R_3$ is hydrogen or methyl; and Q is a salt of an ammonium cation, such as $NH(CH_2)_nN^+(R_{4,5,6})_3X^-$ or $O(CH_2)_nN^+(R_{4,5,6})_3X^-$ wherein $n=1$ to 6 and $R_4$, $R_5$ and $R_6$ can be hydrogen, a $C_1$ to $C_6$ linear or branched alkyl group, a $C_5$ to $C_8$ cycloalkyl, aromatic or alkylaromatic group and $X^-$ is an anion, such as chloride, bromide, or methyl or hydrogen sulfate. Typical but non-limiting ranges of composition of the terpolymer are represented preferably by x equal to 0.1 to 20 mole percent, more preferably 0.2 to 10 mole percent, and most preferably 0.2 to 5 mole percent. The mole percentage of acrylamide, y, is preferably 0 to 94.9, more preferably 10 to 94.8, and most preferably 25 to 94.8. The mole percentage of the cationic monomer, z, is preferably 5 to 99.9, more preferably 5 to 80, most preferably 5 to 70.

The present invention includes terpolymers exemplified by the following formula:

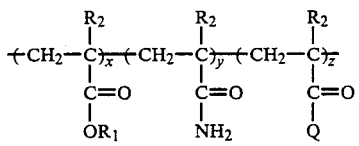

wherein $R_1$ is preferably a $C_4$ to $C_{30}$ linear or branched alkyl, alkylcycloalkyl, or alkylaryl group, more preferably $C_6$ to $C_{22}$ and most preferably $C_6$ to $C_{18}$; and $R_2$ is hydrogen or methyl; and wherein Q is a salt of an ammonium cation, such as $NH(CH_2)_nN^+(R_{4,5,6})_3X^-$ or $O(CH_2)_nN^+(R_{4,5,6})_3X^-$ wherein $n=1$ to 6, and $R_4$, $R_5$ and $R_6$ can be hydrogen, a $C_1$ and $C_6$ linear or branched alkyl group, a $C_5$ to $C_8$ cycloalkyl, aromatic or alkylaromatic group; and $X^-$ is an anion, such as chloride, bromide, or methyl or hydrogen sulfate. Typical but non-limiting ranges of composition of the terpolymer are represented preferably by x equal to 0.1 to 20 mole percent, more preferably 0.2 to 10 mole percent, and most preferably 0.2 to 5 mole percent. The mole percentage of acrylamide, y, is preferably 0 to 94.9, more preferably 10 to 94.8 and most preferably 25 to 94.8. The mole percentage of the cationic monomer, z, is preferably 5 to 99.9, more preferably 5 to 80, most preferably 5 to 70.

The present invention can also be exemplified by the following formula:

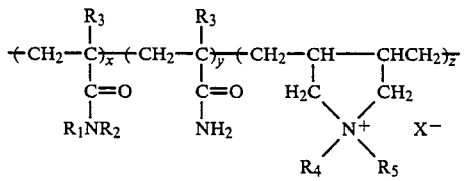

wherein $R_1$ is preferably a $C_4$ to $C_{30}$ linear or branched alkyl, alkylcycloalkyl group or alkylaryl group, more preferably $C_6$ to $C_{20}$, and most preferably $C_6$ to $C_{18}$; and $R_2$ is the same or different group as $R_1$ or hydrogen or $C_1$ to $C_3$ linear or branched alkyl group; $R_3$ is hydrogen or methyl; $R_4$ and $R_5$ can be hydrogen, a $C_1$ to $C_6$ linear or branched alkyl group, a $C_5$ to $C_8$ cycloalkyl, aromatic or alkylaromatic group; and $X^-$ is an anion, such as chloride, bromide or methyl sulfate. Typical but non-limiting ranges of composition of the terpolymer are represented preferably by x equal to 0.1 to 20 mole percent, more preferably 0.2 to 10 mole percent, and most preferably 0.2 to 5 mole percent. The mole percentage of acrylamide, y, is preferably 0 to 94.9, more preferably 10 to 94.8, and most preferably 25 to 94.8. The mole percentage of the cationic monomer, z, is preferably 5 to 99.9, more preferably 5 to 80, most preferably 5 to 70.

The present invention can also be exemplified by the following formula:

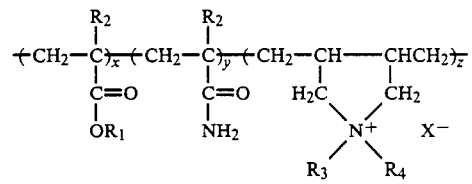

wherein $R_1$ is preferably a $C_4$ to $C_{30}$ linear or branched alkyl, cycloalkyl group or alkylaryl group, more preferably $C_6$ to $C_{22}$, and most preferably $C_6$ to $C_{18}$; $R_2$ is hydrogen or methyl; $R_3$ and $R_4$ can be hydrogen, a $C_1$ to $C_6$ linear or branched alkyl group, a $C_5$ to $C_8$ cycloalkyl, aromatic or alkylaromatic group; and $X^-$ is an anion, such as chloride, bromide or methyl sulfate. Typical but non-limiting ranges of composition of the terpolymer are represented preferably by X equal to 0.1 to 20 mole percent, more preferably 0.2 to 10 mole percent and most preferably 0.2 to 5 mole percent. The mole percentage of acrylamide, y, is preferably 0 to 94.9, more preferably 10 to 94.8, and most preferably 25 to 94.8. The mole percentage of the cationic monomer, z, is preferably 5 to 99.9, more preferably 5 to 80, most preferably 5 to 70.

The novel hydrophobically associating cation containing terpolymers of this invention are prepared by a novel micellar free radical terpolymerization process, more fully described in copending application Attorney Docket No. C-1960. The process comprises the steps of forming a micellar surfactant solution of the oil soluble or hydrophobic alkylacrylamide in an aqueous solution of acrylamide; deaerating this solution by purging with an inert gas, such as nitrogen, or additionally applying a vacuum; raising the temperature to the desired reaction temperature; adding sufficient free radical initiator to the reaction solution; and polymerizing for a sufficient period of time at a sufficient temperature to effect polymerization. The resulting terpolymer of acrylamide, cationic monomer and hydrophobic monomer can be isolated from the reaction mixture by any of a variety of techniques which are well known to one skilled in the art. For example, the polymer may be recovered by precipitation using a non-solvent, such as acetone, methanol, isopropanol or mixtures thereof. The precipitated polymer can then be washed and oven dried to provide a product in the form of a free flowing powder. Alternatively, the polymer solution may be used as is by diluting with the desired aqueous solvent to the concentration of use.

The process for synthesizing these terpolymers relies on solubilizing the water insoluble monomer into a predominantly aqueous media by the use of a suitable water soluble surfactant, such as dodecyl trimethylammonium chloride. When mixed with an aqueous solution of the water soluble acrylamide monomer and the water soluble cationic monomer the surfactant solution can disperse the water insoluble monomer on an extremely fine scale so that the reaction mixture is isotropic, clear and homogeneous. These micellar reaction mixtures are free of visible oil droplets or particulates of the water insoluble monomer. The terpolymerization can, therefore, be initiated by water soluble initiators to yield terpolymers which are substantially free of visible particulates. The resultant reaction mixture remains homogeneous throughout the course of the reaction without the need for agitation with external mixers or stirrers.

The surfactants used in this process may be one of the water soluble surfactants, such as alkyltrimethylammonium halides, either chlorides or bromides. Preferred are decyltrimethylammoniuim chloride, dodecyltrimethyldmmonium chloride and tetradecyltrimethylammonium chloride. For these ionic surfactants the Krafft point, which is defined as the minimum temperature for micelle formation, must be below the temperature used for the polymerization. Thus, at the conditions of polymerization the desired surfactant will form micelles, which solubilize the water insoluble monomer. Nonionic surfactants can also be used for preparing the polymers of this invention. For example, ethoxylated alcohols, ethoxylated alkyl phenols, ethoxylated dialkylphenols, ethylene oxide-propylene oxide copolymers and polyoxyethylene alkyl ethers and esters can be used. Preferred nonionic surfactants are ethoxylated nonylphenol with 5 to 20 ethylene oxide units per molecule, ethoxylated dinonyl phenol containing 5 to 40 ethylene oxide units per molecule and ethoxylated octyl phenol with 5 to 15 ethylene oxide units per molecule.

The advantage of the polymers disclosed here over polymers currently used is the discovery that the presence of a hydrophobic group on the water soluble polymer results in a significant improvement in performance, namely, the breaking of reverse emulsions and the removal of emulsified or dispersed oil from waste waters. By way of example, oil droplets emulsified in water generally carry a negative surface charge or zeta potential which helps to stabilize the emulsion, keeping the droplets dispersed and making them difficult to resolve or break. Cationic polymers or surfactants are used to neutralize the surface charge. Once the charge is neutral the droplets may begin to approach each other and agglomerate or coalesce since the electrostatic repulsion responsible for a significant portion of the emulsion's stability has been eliminated. Eventually large floc formation or liquid oil formation occurs. Once the droplets begin to flocculate they can begin to float since they are much larger than the starting oil droplets. As they grow in size they will rise to the surface of the water at a faster rate. If a high molecular weight cationic polymer is used for charge neutralization, the polymer will accelerate the separation of the oil since the polymer is attracted to the oil droplet by coulombic attraction, hydrogen bonding or other mechanisms. In some cases low molecular weight cationic chemicals are added for charge control and then high molecular weight nonionic or anionic polymers are added next to cause polymer bridging between droplets and accelerate floc formation.

The advantage of the disclosed polymers is related to the fact that they are water dispersible to water soluble but also contain small amounts of hydrophobic groups. Not wishing to be bound by theory, we believe that while conventional polymers can only attach themselves to oil droplets by coulombic attraction, hydrogen bonding or other mechanisms, the hydrophobic groups of these novel terpolymers can also be attracted by a hydrophobic group - hydrophobic oil droplet association. While coulombic attraction still appears to be the strongest type of attraction, the hydrophobic association or hydrophobic effect appears to add a significant strengthening to this attraction as evidenced by improved emulsion breaking and waste water clean-up. Indications are that the cationic hydrophobic polymers of this invention enable the formation of very strong floc particles. This is based on the observation that, unlike many conventional treatments, the floc articles produced by using the polymers of this invention are very difficult to redisperse. Adsorption of the hydrophobic functionalized water soluble polymer on the surface of the oil droplets is believed to be the cause of this observation.

The process for the removal of the emulsified oil from the water comprises adding under suitable agitation conditions about 0.1 to about 200 ppm of the hydrophobically functionalized water soluble cationic polymer to the waste water containing the emulsified oil droplets. After contacting under suitable agitation conditions for a prescribed time period, the emulsified oil droplets and polymer separate under quiescent conditions into a distinct layer from the water. The disclosed polymers are used at a concentration which depends on the amount of oil present and several other factors. The rate of mixing after polymer addition varies, depending on the type of water being treated, the amount of oil emulsified in the water, temperature and several other conditions. The concentration of oil remaining in the water after treatment with the disclosed polymers is significantly less than the concentration of oil remaining in the water after similar treatment with a similar polymer not containing the novel hydrophobe functionalization. The oil layer which has separated as a distinct layer can be removed from the water by conventional methods.

While it is difficult to exactly simulate a process to break oily water emulsions and oil field produced fluids, commonly referred to as reverse emulsions, it is common practice to make laboratory emulsions using crude oil from an oil production field of interest by high shear mixing the given crude into water using a Waring blender or homogenizer. The formed oil-in-water emulsion can then be diluted with water and other suitable materials to stimulate the oil production field being studied. The emulsions thus produced simulate oily waste waters from a given area but are recognized as being an approximation. One would typically use these laboratory emulsions for testing chemical additives in the laboratory prior to confirmatory testing on the actual system in the field.

A common laboratory test used to simulate a mild water clarification process in the field is what is referred to as the Jar Test. The Jar Test involves putting 500 ml of a laboratory prepared or actual field emulsion into 600 ml clear glass beakers (six at a time). Larger beakers may be used if enough fluid is available. The beakers are then placed on a six paddle Phipps & Bird stirrer and mixed at a high rate, referred to as the fast mix period. Polymer is added at this mixing speed and timing is begun. After a specified amount of time at high speed, the mixing rate is reduced to a much slower rate for another specified amount of time. The beakers are removed from the mixer and allowed to stand for another period of time. Samples of solution are removed from a point near the 250 ml mark on the beakers and tested for turbidity (NTU) using standard test equipment and oil-in-water content using one of several available methods. An example of one of the oil-in-water determinations is to Freon-extract the oil from a waste water and then measure its infrared absorbance relative to a standard. The object of the test is to achieve the lowest NTU or oil level using the smallest amount of polymer. The actual mixing rates and times used in the Jar Test depend on the system being simulated and vary from study to study. The Jar Test, from the experience of many investigators over the years, has been shown to provide a good simulation of field clarification systems.

Another laboratory test commonly used in the current art is the Wemco 1+1 Laboratory Flotation Machine, available from Wemco in Sacramento, California. The technique used by the Wemco is also commonly referred to as induced air flotation. The Wemco 1+1 Laboratory Flotation Machine is a small scale pilot unit designed to model the full scale units, built by Wemco, which are commonly used in oil fields and in several other industries for water clarification and oil and solids removal. The laboratory Wemco, from the experience of several investigators over the years, has been found to provide a good simulation of what will occur in the larger unit when it is used in the evaluation of chemical additives. Laboratory prepared or actual field waste waters or emulsions are added to the test bowl of the Wemco and mixed for a few seconds with chemical additives without aeration. The air is then turned on and flotation occurs. Samples of the Wemco treated water are then withdrawn from a point near the bottom of the bowl for turbidity and oil-in-water determinations as described above.

DESCRIPTION OF THE PREFERRED EMBODIMENTS

The following Examples illustrate the present invention without, however, limiting the same hereto.

EXAMPLES 1-24

Micellar Polymerization of N-1-Octylacrylamide, MAPTAC and Acrylamide

A micellar surfactant solution was prepared in 500 ml of deoxygenated water. N-1-octylacrylamide, $C_8AM$, was dissolved in this solution, followed by acrylamide and 3-methacrylamidopropyltrimethylammonium chloride, MAPTAC. The resulting solution was carefully transferred to a 1 L Morton style resin kettle fitted with a chilled water condenser, thermometer, inert gas sparger and mechanical stirrer. The temperature was adjusted to 25° C. and polymerization was initiated by the addition of $K_2S_2O_8$, followed by $Na_2S_2O_5$. After stirring for 16 hours at 25±0.2° C. the viscous solution was poured slowly into 3 L of acetone. The precipitated polymer was then masticated in a Waring blender with additional acetone, filtered and dried under vacuum at 30° C. A variety of terpolymers were prepared using similar techniques with differing amounts of hydrophobic $C_8AM$ monomer, cationic MAPTAC monomer and micellar surfactants as listed in Table I. The surfactants used for the micellar solutions were dodecyltrimethylammonium chloride, Quat, and ethoxylated nonylphenol with 10-11 ethoxy groups, C0-710, supplied by GAF. The elemental analysis of these polymers is given in Table II.

These Examples demonstrate compositions covering a range of hydrophobic and cationic monomer levels.

EXAMPLES 25-27

Micellar Polymerization with Other Cationic Monomers

A micellar surfactant solution was prepared in 500 ml of deoxygenated water. N-octylacrylamide, $C_8AM$, was dissolved in this solution, followed by acrylamide and cationic monomer. The resulting solution was carefully transferred to a 1 L Morton style resin kettle fitted with a chilled water condenser, thermometer, inert gas sparger and mechanical stirrer. The temperature was adjusted to 25° C. and polymerization was initiated by the addition of $K_2S_2O_8$, followed by $Na_2S_2O_5$. After stirring for 16 hours at 25±0.2° C., the viscous solution was poured slowly into 3 L of acetone. The precipitated polymer as then masticated in a Waring blender with additional acetone, filtered and dried under vacuum at 30° C. A variety of terpolymers, listed in Table III, were prepared with 2-methacrylatoethyl trimethylammoniuim chloride, METAC, and diallyl dimethylammonium chloride, DMDAAC, using similar techniques. The yields and analysis of the isolated polymers are given in Table IV.

EXAMPLES 28-30

Micellar Polymerization with Other Hydrophobic Monomers

A micellar surfactant solution was prepared in 500 ml of deoxygenated water. Hydrophobic monomer was dissolved in this solution, followed by acrylamide and MAPTAC. The resulting solution was carefully transferred to a 1 L Morton style resin kettle fitted with a chilled water condenser, thermometer, inert gas sparger and mechanical stirrer. The temperature was adjusted to 25° C. and polymerization was initiated by the addition of $K_2S_2O_8$, followed by $Na_2S_2O_5$. After stirring for 16 hours at 25±0.2° C. the viscous solution was poured slowly into 3 L of acetone. The precipitated polymer was then masticated in a Waring blender with additional acetone, filtered and varied under vacuum at 30° C. A variety of terpolymers, listed in Table V, were prepared with t-octylacrylamide, t-$C_8AM$, n-dodecylacrylamide, $C_{12}AM$, and dodecylmethacrylate, $C_{12}MA$, using similar techniques. The yields and analysis of the isolated polymers are given in Table VI.

EXAMPLE 31

Synthetic Emulsion I Preparation

Cody crude oil, 10 g, with the free water removed, was emulsified in 49 g of distilled water containing 100 ppm of an anionic surfactant using a Waring blender or a homogenizer. The concentrated emulsion was permitted to sit overnight (approximately 18 hours) in a separatory funnel and then the bottom layer was diluted (25 g of emulsion per liter of distilled water) and salinity adjusted to 600 ppm NaCl.

This resulted in a test emulsion with the following typical properties:
Turbidity: 270 to 280 NTU
Oil Content: 420 to 450 mg/l
pH: 8.0 (adjusted)

Usually a large volume of this emulsion (15 liters) was prepared and any unused portion was discarded at the end of the day. The emulsion concentrate was occasionally prepared several days ahead of time and removed from the separatory funnel after the prescribed aging time.

EXAMPLE 32

Synthetic Emulsion II Preparation

Bakersfield crude oil, 10 g, with the free water removed, was emulsified into 495 grams of distilled water using a homogenizer. The concentrated emulsion was permitted to sit overnight (approximately 18 hours) in a separatory funnel and then the bottom layer was diluted (25 g of emulsion per liter of distilled water) and salinity adjusted to 600 ppm NaCl.

This resulted in a test emulsion with the following typical properties:

Turbidity: 160 to 190 NTU
Oil Content: 160 to 190 mg/l
pH: 8.0 (adjusted) Usually a large volume of this emulsion, 15 liters, was prepared and any unused portion discarded at the end of the day. The emulsion concentrate was occasionally prepared several days ahead of time and removed from the separatory funnel after the prescribed aging time.

EXAMPLE 33

Oily Water Jar Test

The test emulsion, prepared in Example 31, is separated into 500 ml samples, as needed, in 600 ml clear glass beakers (six at a time) and placed on a six paddle Phipps & Bird stirrer and mixed at approximately 150 to 160 rpm. Polymer is added at this mixing speed and timing is begun. After 30 minutes at high speed the mixing rate is reduced to 10 rpm for 15 minutes and then the beakers are removed from the mixer and allowed to stand for 60 minutes. Samples of solution are removed from a point near the 250 ml mark on the beakers and tested for turbidity (NTU) and oil-in-water content. The object of the test is to achieve the lowest NTU or oil level using the smallest amount of polymer.

A typical set of test results, which demonstrates the performance of conventional water soluble polymers using a laboratory simulated waste water emulsion Jar Test are shown below.

| ppm Oil Remaining After Treatment with Polymer Polymers: A - Epipolyamine Adduct of Epichlorohydrin B - 59 Wt. % Cationic Acrylamide Starting level = 465 ppm, 275 NTU | | | |
|---|---|---|---|
| Polymer | ppm Active Polymer | NTU Remaining | Oil Remaining |
| A | 0.25 | 260 | 464 |
|   | 0.38 | 115 | 430 |
|   | 0.50 | 180 | 450 |
|   | 0.75 | 240 | 445 |
|   | 1.00 | 260 | 462 |
| B | 0.30 | 275 | 249 |
|   | 0.60 | 140 | 167 |
|   | 0.90 | 32 | 273 |
|   | 1.20 | 50 | 375 |
|   | 1.50 | 80 | 415 |
|   | 1.80 | 100 | 421 |

The data indicate that the conventional polymers did not remove too much of the oil but had a larger effect on turbidity reduction. Oil removal is the critical parameter.

EXAMPLE 34

Oily Water Jar Test

A test similar to Example 33 was run using two polymers made by the process in Examples 1-24. One polymer, Example 10, was made with 5% cationic MAPTAC monomer, 1% $C_8AM$ hydrophobe, the remainder being acrylamide; while the other, Example 9, was made under identical conditions but with no hydrophobic monomer added. Example 9 is similar to commercial polymers. A typical set of test results, which demonstrates the benefits of hydrophobic functionalization of water soluble polymers taught in this invention, using a laboratory simulated waste water emulsion jar test, are shown below.

| ppm Oil Remaining After Treatment with Polymer (starting oil = 505 ppm) | | |
|---|---|---|
| ppm Polymer | Example 10 | Example 9 |
| 1.0 | 461 | 483 |
| 2.0 | 459 | 455 |
| 3.0 | 152 | 417 |
| 3.5 | 95 |   |
| 4.0 | 25 | 28 |
| 4.5 | 13 |   |
| 5.0 | 5.6 | 20 |
| 5.5 | 4.6 |   |
| 6.0 | 6.1 | 36 |
| 7.0 | 9.3 | 60 |

The difference in performance between Examples 9 and 10 is due to the added hydrophobic monomer to the water dispersible or water soluble polymer. The hydrophobe containing polymer, Example 10, of this invention produces the cleaner water and is not as susceptible to over treating as the conventional polymer, Example 9.

EXAMPLE 35

The test method described in Example 33 was used to test a series of polymers on an emulsion prepared according to the method in Example 32 using a Hawkins crude oil. The performance data, summarized below, clearly show that the use of hydrophobic functionalization of water soluble polymers provides improved oily water clean-up.

| ppm Oil Remaining After Treatment with Polymer (starting oil = 257 ppm) | | | | | | |
|---|---|---|---|---|---|---|
| | | Polymer Concentration, ppm | | | | |
| Polymer | Hydrophobe | 1.0 | 1.5 | 2.0 | 2.5 | 3.0 |
| Example 16 | None | 241 | 58 | 112 | 245 | 265 |
| Example 17 | 1.0% $C_8AM$ | 236 | 10 | 54 | 48 | 7 |
| Example 18 | 1.5% $C_8AM$ | 55 | 37 | 6 | 25 |   |

EXAMPLE 36

An induced air flotation test was used in the laboratory to simulate field induced air flotation units. A Wemco 1+1 Laboratory Flotation Machine, available from Wemco in Sacramento, California, was used. Three liters of emulsion prepared in Example 31 were placed in the Wemco vessel. The mixer was turned on and maintained at 1,000 rpm and test polymer added and mixed for 30 seconds. The air was then turned full on while mixing continued for 120 seconds. At this time froth was formed and oil floated to the surface if an effective polymer or additive was present. The unit was turned off after the 120 seconds aeration and permitted to sit without movement for 30 seconds. Samples for turbidity and oil analyses were withdrawn by pipet from a fixed point in the bottom of the vessel after the 30 second wait. The polymers tested are defined below, along with the performance data.

| | ppm Oil Remaining After Treatment with Polymer (starting oil = 483 ppm) | | | | | | |
|---|---|---|---|---|---|---|---|
| | Hydrophobe | | ppm Active Polymer | | | | |
| Polymer | Type | Mole % | 1.0 | 1.5 | 2.0 | 2.5 | 3.0 |
| Example 16 | None | | 258 | 119 | 103 | 228 | |
| Example 17 | C₈AM | 1.0 | | 104 | 82 | 199 | |
| Example 18 | C₈AM | 1.5 | 197 | 134 | 91 | 63 | 122 |
| Example 28 | tC₈AM | 1.0 | | 118 | 106 | 184 | |
| Example 29 | C₁₂AM | 1.0 | | 146 | 116 | 191 | |

The data indicate that at a high cationic charge density, 20 mole%, there is a benefit to having hydrophobe on the water soluble polymer backbone and that normal octyl is the most efficient under the conditions of the Example.

TABLE I

Compositional Data for Acrylamide-MAPTAC Polymers

| Example No. | MAPTAC, Mole % | C₈AM Mole % | Surfactant Type | Surfactant Wt. % | Monomer Concentration Wt. % | Initiators $K_2S_2O_8$ [M × $10^4$] | Initiators $Na_2S_2O_5$ [M × $10^4$] |
|---|---|---|---|---|---|---|---|
| 1 | 20 | 1.0 | Quat | 3 | 4.5 | 0.81 | 0.81 |
| 2 | 20 | 0.0 | Quat | 3 | 4.5 | 0.83 | 0.83 |
| 3 | 20 | 1.0 | Quat | 3 | 6.0 | 0.81 | 0.81 |
| 4 | 20 | 1.0 | Quat | 3 | 9.0 | 0.81 | 0.81 |
| 5 | 20 | 1.0 | Quat | 4.5 | 9.0 | 0.81 | 0.81 |
| 6 | 20 | 1.0 | Quat | 6 | 12 | 0.81 | 0.81 |
| 7 | 20 | 0.0 | — | | 4.5 | 0.83 | 0.83 |
| 8 | 20 | 1.0 | Quat | 3 | 4.5 | 0.81 | 0.81 |
| 9 | 5 | 0.0 | Quat | 3 | 9.0 | 1.4 | 1.4 |
| 10 | 5 | 1.0 | Quat | 3 | 9.0 | 1.3 | 1.3 |
| 11 | 5 | 1.0 | Quat | 3 | 4.5 | 1.3 | 1.3 |
| 12 | 10 | 1.0 | Quat | 3 | 4.5 | 1.1 | 1.1 |
| 13 | 5 | 1.0 | Quat | 4.5 | 4.5 | 1.3 | 1.3 |
| 14 | 20 | 1.0 | CO-710 | 5 | 4.5 | 0.81 | 0.81 |
| 15 | 20 | 0.0 | — | | 4.5 | 0.83 | 0.83 |
| 16 | 20 | 0.0 | CO-710 | 3 | 4.5 | 0.83 | 0.83 |
| 17 | 20 | 1.0 | CO-710 | 3 | 4.5 | 0.81 | 0.81 |
| 18 | 20 | 1.5 | CO-710 | 3 | 4.5 | 0.80 | 0.80 |
| 19 | 10 | 0.0 | Quat | 3 | 4.5 | 1.1 | 1.1 |
| 20 | 10 | 2.5 | Quat | 3 | 4.5 | 1.1 | 1.1 |
| 21 | 10 | 0.0 | Quat | 3 | 4.5 | 1.1 | 1.5 |
| 22 | 10 | 1.5 | Quat | 3 | 4.5 | 1.1 | 1.1 |
| 23 | 10 | 1.0 | CO-710 | 3 | 9.0 | 1.1 | 1.1 |
| 24 | 10 | 1.0 | Quat | 3 | 9.0 | 1.1 | 1.1 |

TABLE II

| Example No. | Elemental Analysis of Terpolymers Cl Analysis, % Calc | Elemental Analysis of Terpolymers Cl Analysis, % Found | MAPTAC INC.,[a] | Conversion |
|---|---|---|---|---|
| 1 | 6.96 | 6.39 | 104 | 87.6 |
| 2 | 7.03 | 6.20 | 97 | 96.9 |
| 3 | 6.96 | 5.87 | 92 | 100 |
| 4 | 6.96 | 5.72 | 92 | 100 |
| 5 | 6.96 | 6.52 | 103 | 89.6 |
| 6 | 6.96 | 6.80 | 108 | 82.9 |
| 7 | 7.03 | 5.35 | 84 | 22.8 |
| 8 | 6.96 | 6.33 | 100 | 84.8 |
| 9 | 2.26 | 2.02 | 96 | 99.1 |
| 10 | 2.23 | 1.74 | 85 | 94.5 |
| 11 | 2.23 | 1.96 | 97 | 100 |
| 12 | 4.08 | 3.47 | 94 | 94.7 |
| 13 | 2.23 | 2.03 | 94 | 96.0 |
| 14 | 6.96 | 6.36 | 99 | 75.6 |
| 15 | 7.03 | 5.36 | 84 | 48.4 |
| 16 | 7.03 | 5.94 | 91 | 77.8 |
| 17 | 6.96 | 6.27 | 97 | 76.3 |
| 18 | 6.92 | 6.54 | 102 | 72.1 |
| 19 | 4.13 | 3.35 | 87 | 100 |
| 20 | 4.00 | 3.61 | 97 | 100 |
| 21 | 4.13 | 3.72 | 92 | 95.3 |
| 22 | 4.05 | 3.81 | 97 | 90.4 |
| 23 | 4.08 | 3.24 | 83 | 73.8 |
| 24 | 4.08 | 3.68 | 94 | 95.8 |

[a]MAPTAC incorporation = Cl(found)/Cl(calc) × 100 corrected for polymer volatiles content.

TABLE III

Additional Cationic Terpolymers

| Example No. | Cationic Monomer (Mole %) | C₈AM Mole % | Surfactant Type | Surfactant Wt. % | Monomer Concentration Wt. % | Redox Initiator $K_2S_2O_8$ [M × $10^4$] | Redox Initiator $Na_2S_2O_5$ [M × $10^4$] |
|---|---|---|---|---|---|---|---|
| 25 | METAC (10) | 1.0 | CO-710 | 3 | 9.0 | 0.81 | 0.81 |
| 26 | DMDAAC (20) | 1.0 | CO-710 | 5 | 4.5 | 0.81 | 0.81 |
| 27 | DMDAAC (20) | 1.0 | Quat | 3 | 4.5 | 0.81 | 0.81 |

TABLE IV

| Example No. | Elemental Analysis of Terpolymers Cl Analysis, % Calc. | Elemental Analysis of Terpolymers Cl Analysis, % Found | Cationic Monomer Inc.[a] % | Conversion % |
|---|---|---|---|---|
| 25 | 4.14 | 2.85 | 69 | 80.0 |
| 26 | 7.87 | 1.75 | 22 | 61.3 |

TABLE IV-continued

Elemental Analysis of Terpolymers

| Example No. | Cl Analysis, % Calc. | Cl Analysis, % Found | Cationic Monomer Inc.[a] % | Conversion % |
|---|---|---|---|---|
| 27 | 7.87 | 2.10 | 27 | 67.7 |

[a]Cationic monomer incorporation = Cl(found)/Cl(calc) × 100 corrected for polymer volatiles content.

TABLE V

Terpolymers with Other Hydrophobic Monomers

| Example No. | MAPTAC (Mole %) | Hydrophobe Type | Hydrophobe Mole % | Surfactant Type | Surfactant Wt. % | Monomer Concentration Wt. % | Initiator $K_2S_2O_8$ [M × 10⁴] | Initiator $Na_2S_2O_5$ [M × 10⁴] |
|---|---|---|---|---|---|---|---|---|
| 28 | 20 | t-C₈AM | 1.0 | CO-710 | 3 | 4.5 | 0.81 | 0.81 |
| 29 | 20 | C₁₂AM | 1.0 | CO-710 | 3 | 4.5 | 0.81 | 0.81 |
| 30 | 10 | C₁₂MA | 1.0 | CO-710 | 5 | 9.0 | 0.81 | 0.81 |

TABLE VI

Elemental Analysis of Terpolymers

| Example No. | Hydrophobe Type | Hydrophobe Mole % | Cl Analysis Calculated | Cl Analysis Found | Cationic Incorporation[a] % | Conversion % |
|---|---|---|---|---|---|---|
| 28 | t-C₈AM | 1.0 | 6.96 | 6.13 | 97 | 84.0 |
| 29 | C₁₂AM | 1.0 | 6.92 | 6.30 | 103 | 79.5 |
| 30 | C₁₂MA | 1.0 | 4.04 | 2.15 | 53 | 64.2 |

[a]Cationic monomer incorporation = Cl (found/Cl, (calc) × 100 corrected for polymer volatiles content.

What is claimed is:

1. A polymer composition consisting of the formula:

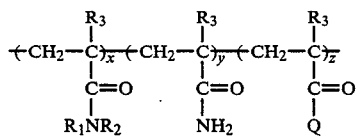

wherein $R_1$ is a $C_4$ to $C_{30}$ linear, branched alkyl, alkylcycloalkyl or alkylaryl group; $R_2$ is the same type of group as $R_1$; $R_3$ is hydrogen or methyl; Q is $NH(CH_2)_nN^+(R_{4,5,6})_3X^-$ or $O(CH_2)_nN^+(R_{4,5,6})_3X^-$ wherein n=1 to 6 and $R_4$, $R_5$ and $R_6$ are hydrogen, a $C_1$ to $C_6$ linear or branched group, or $C_5$ to $C_8$ cycloalkyl, aromatic or alkylaromatic group; $X^-$ is an anion selected from the group consisting of chloride, bromide or methyl or hydrogen sulfate; and x equals 0.1 to 20 mole percent; y is 10 to 94.9 mole percent; and z is 5 to 99.9 mole percent.

2. A polymer according to claim 1 wherein $R_1$ is t-octyl, linear octyl, decyl or dodecyl with substitution at the 1-carbon or a mixture comprising all substitutions along the alkyl group except the 1-carbon atom.

3. A polymer according to claim 2 wherein said alkylacrylamide is present at a level of 0.2 to 5.0 mole percent.

4. A polymer according to claim 1 wherein said cationic monomer is selected from the group comprising 3-methacrylamidopropyltrimethylammonium chloride or methyl sulfate, and 3-methacrylamidopropyldimethylammonium hydrogen sulfate and 2-methacrylatoethyltrimethylammonium chloride or methyl sulfate.

5. A polymer according to claim 1 wherein said cationic monomer is present at a level of 5 to 50 mole percent.

6. A polymer characterized by the formula:

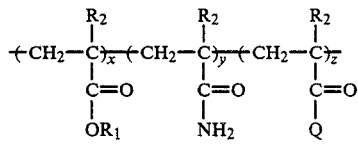

wherein R is a $C_4$ to $C_{30}$ linear or branched alkyl, alkylcycloalkyl or alkylaryl group; $R_2$ is hydrogen or methyl; Q is $NH(CH_2)_nN^+(R_{3,4,5})_3X^-$ or $O(CH_2)_nN^+(R_{3,4,5})_3X^-$ wherein n=1 to 6, and $R_3$, $R_4$ and $R_5$ are hydrogen, a $C_1$ to $C_6$ linear or branched group, or a $C_5$ to $C_8$ cycloalkyl, aromatic or alkylaromatic group; $X^-$ is an anion selected from the group consisting of chloride, bromide, or methyl or hydrogen sulfate; and x is 0.1 to 20 mole percent; y is 0 to 94.9 mole percent; and z is 5 to 99.9 mole percent.

7. A polymer according to claim 6 wherein $R_1$ is dodecyl and $R_2$ is methyl.

8. A polymer according to claim 7 wherein said dodecylmethacrylate is present at a level of 0.2 to 5.0 mole percent.

9. A polymer according to claim 6 wherein said cationic monomer is selected from the group comprising 3-methacrylamidopropyltrimethylammonium chloride or methyl sulfate, and 3-methacrylamidopropyldimethylammonium hydrogen sulfate and 2-methacrylatoethyltrimethylammonium chloride or methyl sulfate.

10. A polymer according to claim 6 or 9 wherein said cationic monomer is present at a level of 5.0 to 50 mole percent.

11. A polymer characterized by the formula:

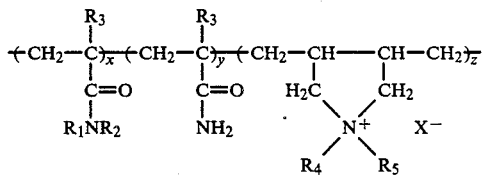

wherein $R_1$ is a $C_6$ to $C_{30}$ linear or branched alkyl, alkylcycloalkyl or alkylaryl group; $R_2$ is the same type of group as $R_1$; $R_3$ is hydrogen or methyl; $R_4$ and $R_5$ are hydrogen, a $C_1$ to $C_6$ linear or branched group, or a $C_5$ to $C_8$ cycloalkyl group, aromatic or alkyl aromatic group; X⁻ is an anion selected from the group consisting of chloride, bromide or methyl sulfate; and x equals 0.1 to 20 mole percent; y is 0 to 94.9 mole percent; and z is 5 to 99.9 mole percent.

12. A polymer according to claim 11 wherein $R_1$ is t-octyl, linear octyl, decyl or dodecyl with substitution at the 1-carbon or a mixture comprising all substitutions along the alkyl group except the 1-carbon atom.

13. A polymer according to claim 12 wherein said alkylacrylamide is present at a level of 0.2 to 5.0 mole percent.

14. A polymer according to claim 11 wherein the cationic monomer is diallyldimethylammonium chloride or methyl sulfate present at a level of 5.0 to 50 mole percent.

15. A polymer characterized by the formula:

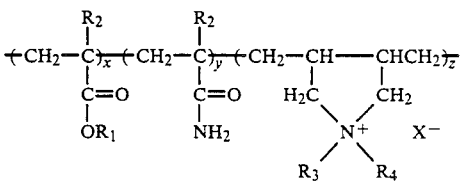

wherein $R_1$ is a $C_4$ to $C_{30}$ linear or branched alkyl, alkylcycloalkyl or alkylaryl group; $R_2$ is hydrogen or methyl; $R_3$ and $R_4$ are hydrogen, a $C_1$ to $C_6$ linear or branched group or a $C_5$ to $C_8$ cycloalkyl, aromatic or alkylaromatic group; $X^-$ is an anion selected from the group consisting of chloride, bromide or methyl sulfate; and x equals 0.1 to 20 mole percent; y is 0 to 94.9 mole percent; and z is 5 to 99.9 mole percent.

16. A polymer according to claim 15 wherein $R_1$ is dodecyl and $R_2$ is methyl.

* * * * *